Oct. 17, 1933.   C. C. BRYANT   1,931,248
MULCHING PRODUCT AND METHOD OF PRODUCING AND USING THE SAME
Filed Oct. 10, 1932
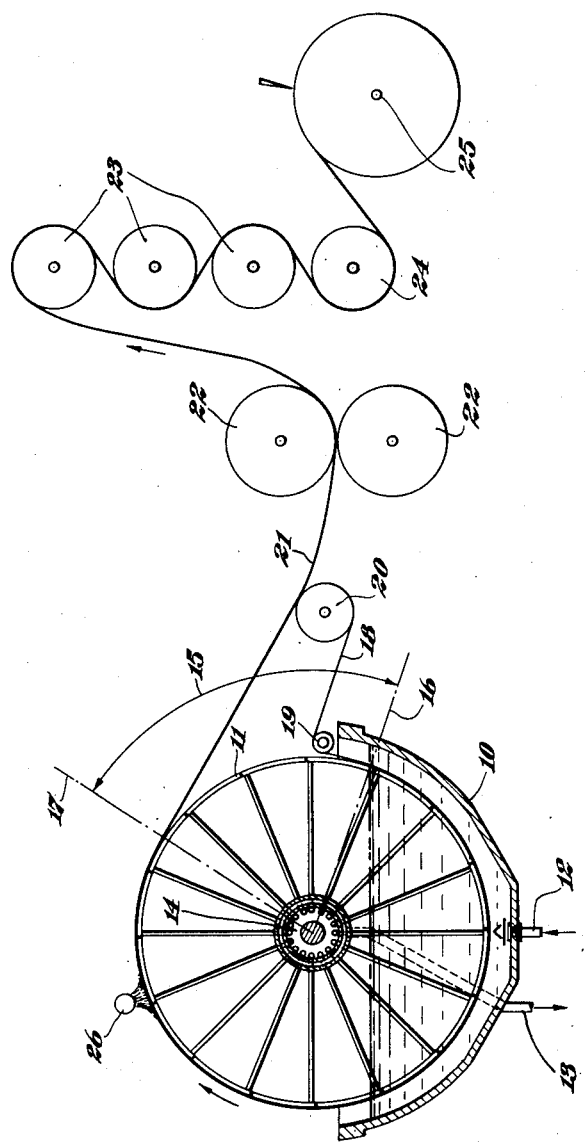
INVENTOR
Carrel C. Bryant,
BY
Frederick Greitenfeld
ATTORNEY Patented Oct. 17, 1933

1,931,248

UNITED STATES PATENT OFFICE 1,931,248

MULCHING PRODUCT AND METHOD OF PRODUCING AND USING THE SAME

Carrel C. Bryant, Morristown, N. J.

Application October 10, 1932. Serial No. 637,069

10 Claims. (Cl. 47—9)

My present invention relates generally to the cultivation of crops, and has particular reference to an improved mulch and to an economical method of producing and using the same.

A general object of my present invention is to provide a new type of mulch in sheet form.

Another, and more specific, object of my invention is to provide a novel method for fertilizing soil; and, more particularly, by the employment and use of a mulch with which materials of fertilizing capabilities are incorporated.

A further object of my invention is to provide for the accomplishment of the foregoing objectives, and others, by a process of great economical efficiency; and, more particularly, by resorting to the use of materials which are usually waste byproducts of an entirely different art.

The characteristics and advantages of so-called "paper mulch" have been the subjects of extensive investigations and experiments within recent years. It is well known that the advantages resulting from the use of a paper mulch include conservation of soil moisture, diminution of weed growth, and increase in soil temperature, and a stimulation of the activity of certain soil microorganisms. As a general rule, these advantages result in increased germination, hence a greater yield of crops per acre, a hastening of maturity, and a superior crop.

Little is known, however, regarding the relation between the use of paper mulch and the application of fertilizers. For example, when paper mulch was first introduced into the pineapple growing industry, its use did not result in a reduction of applications of manure or commercial fertilizers. Nevertheless, it has been ascertained that the use of paper mulch enhances the effectiveness of any fertility that may be added to the soil.

In accordance with my present invention, I am enabled to provide a sheet mulch with which materials of definite soil fertilization value are incorporated; and it is a particular feature of my invention to provide a method whereby the resultant product may be made sufficiently pervious to moisture and sufficiently lacking in strength to undergo a substantial disintegration after a predetermined period of exposure to atmospheric conditions, as a result of which the fertilizing ingredients of my present mulching product may be readily incorporated into the soil at the end of such period. For example, a product may be produced by my present invention which will disintegrate after approximately one season's exposure.

In accordance with my invention, the use of my present product not only produces all the advantages of a so-called paper mulch, as hereinbefore illustratively specified, but simultaneously renders available to the soil certain nutrients of well known fertilization value.

A further feature of my invention lies in the method of producing my present product whereby the cost is materially reduced and whereby its regular use is made commercially practical and economically feasible. In many instances, heretofore, notably in the cultivation of such low value crops as field corn, dry beans, cotton, and sugar cane, the cost of ordinary mulch paper has been too great, with respect to the advantages achieved thereby, to render its use economically practical. On the other hand, my present product is sufficiently inexpensive to permit its use for even such crops, especially in view of the increased fertilizing value which it embodies.

Briefly, I employ for my present purposes the residue of filtered sewage sludge, a product which is usually a waste by-product or whose uses, in any event, have been relatively unimportant. Sewage sludge has lately come to be recognized as embodying valuable soil-fertilizing characteristics, and this is not at all surprising inasmuch as sewage sludge consists essentially of organic matter. In accordance with my present invention, I provide an economical and commercially practical method of conditioning the residue of filtered sewage sludge for use as a mulching product in sheet form.

One of the features of my present process lies in conditioning sewage sludge, during a filtration process, so as to render the resultant filter cake self-sustaining in sheet form. This I accomplish, briefly, by incorporating with the sludge sufficient extraneous fibrous material to bond the constituents of the filter cake into self-sustaining condition.

In accordance with the broader objects of my invention, my process also includes the incorporation of a dark pigment with the filter cake so that the resultant sheet is immediately ready for use as a mulching product.

One of the features of my invention lies in proportioning the ingredients of the resultant sheet so as to render it sufficiently pervious to moisture for substantial disintegration within a predetermined time after application to the ground, the object being, as hereinbefore mentioned, to permit the products of disintegration to be plowed into the soil at the conclusion of the period of use as a mulch.

I achieve the foregoing objects, and such other objects as may hereinafter appear or be pointed out, in the manner illustratively exemplified in the accompanying drawing, wherein—

The figure is a diagrammatic view of a typical apparatus for filtering sewage sludge.

While, from many aspects, my invention is not dependent upon any particular method of transforming organic sewage residue into self-sustaining sheet form, nor upon any particular type of apparatus for filtering the sewage sludge, I prefer to employ a method which involves the use of a filtering device of substantially the characteristics shown in the accompanying drawing. Such an apparatus is illustrated in United States Letters Patent No. 1,825,295 and consists, briefly, in a tank 10 within which a filtering drum 11 rotates. The sewage is fed into the tank through the inlet 12, and the filtrate is withdrawn through the outlet 13, the latter communicating with the axially disposed chamber 14 into which the filtrate is drawn by suitable suction.

The surface of the drum 11 is composed of a plurality of closely positioned sections or compartments, each of which communicates with the central chamber 14 by means of a pipe or conduit through which a suction is applied to the surface of the drum 11. Suitable valves are provided in association with the drum and with the conduits mentioned to provide for an automatic discontinuation of the suction within approximately the range indicated by the arrows 15. In other words, as the drum rotates in a clockwise direction, suction is applied to each pipe from the time the pipe assumes the position of the line 16 until the time that it reaches approximately the position of the line 17. During its travel from the position 17 to the position 16, the suction is automatically discontinued.

Extending around the drum 11 are a series of strings 18 which pass over the guide rollers 19 and 20. The filter cake forms on and around these strings as the drum rotates; and since the strings leave the surface of the drum 11 at a point forming a tangent with the line 17, the filter cake is virtually peeled off of the surface of the drum 11 by these strings at this point. As the strings pass around the roller 20, the filter cake 21 is in turn peeled from the strings themselves, and passes through the press rolls 22. From this point on, the filter cake, which is in sheet form, is treated to dry it; and this treatment may, for example, consist in passing the filter cake over the drying rolls 23, then over the cooling roll 24, and ultimately onto the arbor or mandrel 25.

The ability of the filter cake to be entirely self-sustaining in sheet form, and to be treated as a web or sheet in its passage through and around the rollers 22—24, is due to that step in my present invention which consists in conditioning the sludge in the tank 10 to render the resultant filter cake sufficiently bonded and strong to be self-sustaining. This conditioning consists in adding extraneous fibrous material or particles to the sewage sludge when the latter is fed into the tank 10. Fibrous material of this general character has frequently been resorted to as a mechanical "filter aid", but, so far as I am aware, no fibrous material has ever been added for the present specific purpose or in sufficient quantities to render the resultant filter cake entirely self-sustaining. The type of fibrous material which I may employ is varied in character. Usually, and preferably, it consists of scrap paper pulp or similar cellulose pulp or particles, but in many instances it may consist of ground organic refuse such as stalks, cane, and the like. Kieselguhr, frequently used as a filter aid, is utterly unsuitable for my present purposes, as are similar materials, since it is not fibrous and is incapable of fulfilling the function of bonding the constituents of the filter cake into sheet form.

The amount of extraneous fibrous material added to the sewage sludge will vary, of course, depending upon the type and condition of the sludge itself, the type and characteristics of the filter that is used, the type of fibrous material employed, and the strength that is desired in the resultant sheet. I prefer to use an amount which is just sufficient to render the resultant sheet self-sustaining, since this makes the resultant sheet sufficiently lacking in strength to undergo substantial disintegration within approximately one season's weathering on the ground. Under certain circumstances, the sheet may be caused to be somewhat stronger, so that disintegration is postponed for another season or so, but it will be understood that a sheet constructed in accordance with my present invention should purposely be sufficiently weak and pervious to assure its disintegration within a few seasons, at the most.

The use of my present product as a mulching material or sheet makes it desirable to impart a dark coloration thereto, so as to make it capable of absorbing and retaining heat; and with this object in view, I add a pigment of dark coloration to the sheet during its course of manufacture. Although the manner in which this may be accomplished is largely optional, I have found it satisfactory to incorporate it with the sheet by spraying it onto the filter cake at approximately the position shown diagrammatically at 26. The material used may be, in general, any dark colored pigment which is of non-toxic character so far as soil cultivation is concerned, and which is preferably slightly water-repellant. Materials such as dextrin, starch, flour, paraffin, or the like, are satisfactory, and if they do not themselves embody the proper coloration, a suitable pigment such as carbon may be admixed therewith. Fish oils, linseed oil, or other animal or vegetable oils, which by oxidation become stiff enough to lend strength and at the same time shed water, are also suitable. An ordinary water solution of asphalt may also serve the purpose.

Where the added material serves as an additional strengthener of the filter cake, as may be the case, a correspondingly less amount of fibrous material is added to the sludge in the first place.

The sheet which is wound upon the mandrel 25 is my resultant mulching product. It embodies all of the desirable characteristics of a paper mulch, being substantially impervious to water (though sufficiently pervious for disintegration purposes, as hereinbefore mentioned), being of dark coloration and being capable of transportation and handling in sheet form to permit its contemplated application to the soil adjacent to the crops which are to be treated. In addition to these characteristics, my present product incorporates therewith, and is largely composed of, organic refuse which has a recognized fertilization value; it is designed to undergo almost complete disintegration within approximately a single season or so, so that the products of disintegration may thereupon be plowed into the soil; and it is sufficiently inexpensive to permit its practical and commercial utility in almost all instances where the use of paper mulch has proven effective in crop cultivation.

It will be understood that the product of my present invention is usable in all the ways in which paper mulch has heretofore been used. For example, two sheets may be superposed, with seeds arranged therebetween; or it may be perforated in various ways in accordance with particular requirements. Although I prefer to form it in long continuous sheets, it may be produced or sold in small pieces, as will be readily understood. It may also be employed for the purpose of forming cup-shaped receptacles or pots within which plants may be cultivated, for example, seedlings, the advantage of the product, in the latter case, being that the entire pot may be set into the open ground at the proper time without removing it from around the roots of the seedling. The inherent porosity and weakness of the sheet permits the roots to continue growing and ultimately to puncture the cup or pot, and the fertility in the paper serving at the same time as a nutrient, and ultimately being incorporated with the soil itself.

One of the advantages resulting from my present invention arises from the fact that certain sewage disposal plants produce a residue of acid characteristics, while others produce a residue of alkaline characteristics. Accordingly, by proper choice of sewage residue, the resulting product may be caused to embody either alkaline or acid characteristics, and this is of importance inasmuch as certain soils benefit from one or the other type of fertilization. For example, a mulching product of the present character, which is to be used in connection with a soil naturally acid, should preferably be caused to incorporate sewage residue having alkalinity, and vice versa.

In general, it will be understood that changes in the details herein described and illustrated for the purpose of explaining the nature of my invention may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. The herein-described process of making a sheet mulch, which consists in filtering sewage sludge to produce a filter cake of organic sewage sludge residue, conditioning the sludge during the filtration procedure to render the resultant cake self-sustaining in sheet form, and forming the cake into such a sheet.

2. The herein-described process of making a sheet mulch, which consists in filtering sewage sludge to produce a filter cake of organic sewage sludge residue, combining said residue during the filtration procedure with sufficient fibrous pulp particles to produce a self-sustaining sheet, and forming said cake into such a sheet.

3. The herein-described process of making a sheet mulch, which consists in filtering sewage sludge to produce a filter cake of organic sewage sludge residue, incorporating with the sludge sufficient extraneous fibrous material to render the resultant cake self-sustaining in sheet form, and forming said cake into such a sheet.

4. The herein-described process of making a sheet mulch, which consists in filtering sewage sludge to produce a filter cake in sheet form, incorporating with the sludge sufficient extraneous fibrous material to bond the constituents of said sheet into self-sustaining condition, and forming said cake into a sheet.

5. The herein-described process of cultivating crops, which consists in filtering sewage sludge to produce a filter cake of organic sewage sludge residue, conditioning the sludge during its filtration to render said cake self-sustaining in sheet form, forming said cake into a sheet, imparting a dark coloration to said sheet, applying said sheet as a mulch to the soil surface adjacent to the crops to be treated, permitting the sheet to disintegrate under a predetermined duration of exposure to atmospheric conditions, and plowing the resultant products of disintegration into the soil to incorporate them therewith.

6. A mulch comprising a self-sustaining sheet composed of interlocking fibrous particles of paper pulp and the organic residue of filtered sewage sludge.

7. A filter cake of the character described, comprising organic residue of sewage sludge, and sufficient extraneous fibrous particles to bond the cake into a self-sustaining sheet, whereby said filter cake may be formed and handled as a unitary self-sustaining sheet.

8. The herein-described process of cultivating crops, which consists in filtering sewage sludge to produce a filter cake of organic sewage sludge residue, conditioning the sludge during its filtration to render said cake self-sustaining in sheet form, forming said cake into a sheet, applying said sheet as a mulch to the soil surface adjacent to the crops to be treated, permitting the sheet to disintegrate under a predetermined duration of exposure to atmospheric conditions, and plowing the resultant products of disintegration into the soil to incorporate them therewith.

9. A mulch comprising a self-sustaining sheet composed of a filter cake formed by dehydrating a mixture of interlocking fibrous particles of paper pulp and sewage sludge.

10. As a new article of manufacture, adapted to be used as a mulch, a self-sustaining sheet-form filter cake comprising an interlocking assembly of sewage sludge residue and paper pulp particles.

CARREL C. BRYANT.